May 19, 1959   A. P. DE SEVERSKY   2,887,035
FOOD SEASONING INJECTION DEVICE
Filed Feb. 14, 1956   2 Sheets-Sheet 1

ALEXANDER P. DE SEVERSKY
INVENTOR.

BY Raymond P. Wallace
AGENT

May 19, 1959 A. P. DE SEVERSKY 2,887,035
FOOD SEASONING INJECTION DEVICE
Filed Feb. 14, 1956 2 Sheets-Sheet 2

ALEXANDER P. DE SEVERSKY
INVENTOR.

BY Raymond P. Wallace
AGENT

United States Patent Office 2,887,035
Patented May 19, 1959

---

2,887,035

FOOD SEASONING INJECTION DEVICE

Alexander P. de Seversky, New York, N.Y.

Application February 14, 1956, Serial No. 565,445

6 Claims. (Cl. 99—234)

This invention relates to food preparing and processing apparatus, and more particularly to devices for injecting seasoning materials into meat and the like, before or after cooking, or during any stage of the cooking process.

Heretofore, when it has been desired to embed garlic, cloves, bits of orange peel, or other condiments into food such as a roast of meat or a fowl, it has been necessary to jab or slit the food with a knife, and then insert the seasoning material by hand. This was a slow operation, of indifferent success; it involved picking up the knife for each operation, and the insertion of the seasoning was often not sufficiently deep, resulting in its loss during subsequent handling, or flavoring only the surface of the food.

The present invention provides a device having a magazine which can be charged with the condiment to be used, or with a mixture of seasoning materials. Then, with a simple one-handed stabbing motion, the food may be pierced, a piece of seasoning in the magazine is cut to appropriate size, injected to a sufficient depth into the meat, and the apparatus retracted, whereupon it is ready for another operation. By means of this invention, food articles may thus be injected with seasoning without the necessity for laborious hand-cutting of seasoning material, knife-slitting, and hand-insertion.

It is therefore an object of the present invention to provide a seasoning-injection device.

It is another object to provide a seasoning-injection device operable by one hand.

Another object is to provide a device capable of piercing food objects and depositing seasoning therein by means of a single-thrust motion.

A further object of the invention is the provision of a seasoning device which may be charged with a quantity of seasoning material for repeated operation.

Yet another object of the present invention is to provide a magazine-equipped seasoning device which will cut seasoning material to appropriate size.

A still further object is to provide a seasoning device which will eject seasoning material from stored material.

It is another object of this invention to provide a seasoning device which will penetrate a food article to a desired depth.

An additional object is to provide a chargeable seasoning device which will sequentially pierce a food article, cut a piece of seasoning from the charge, and deposit the cut within the food.

Figure 1:
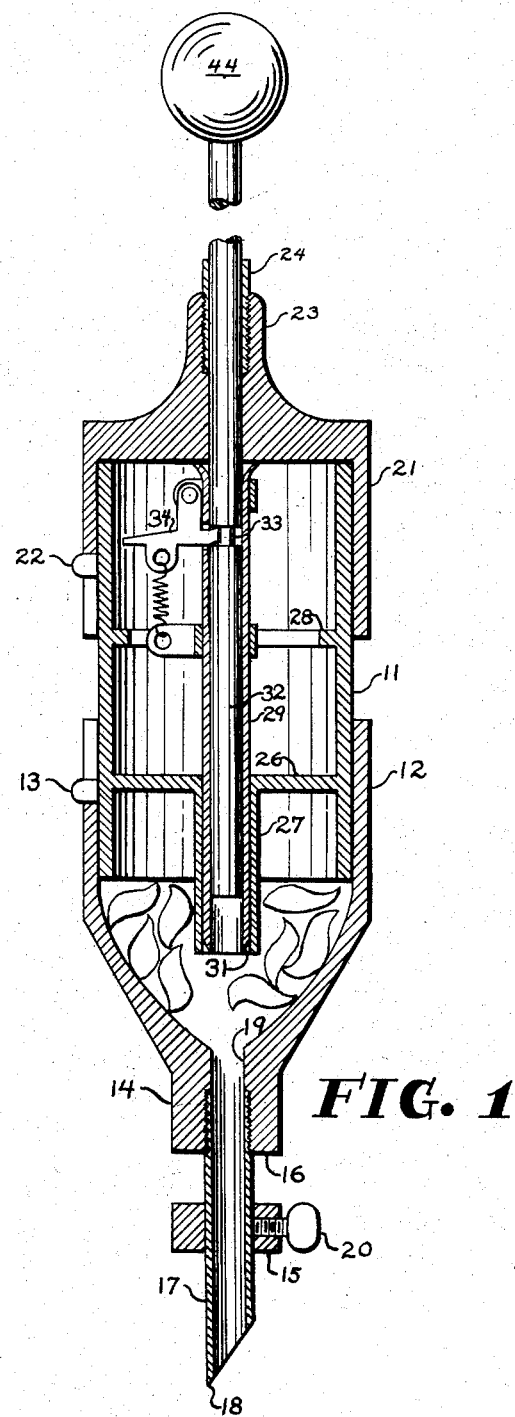
Figure 3:
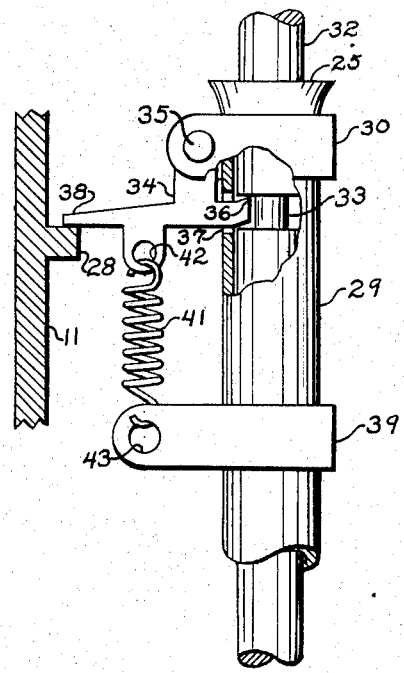
Figure 2:
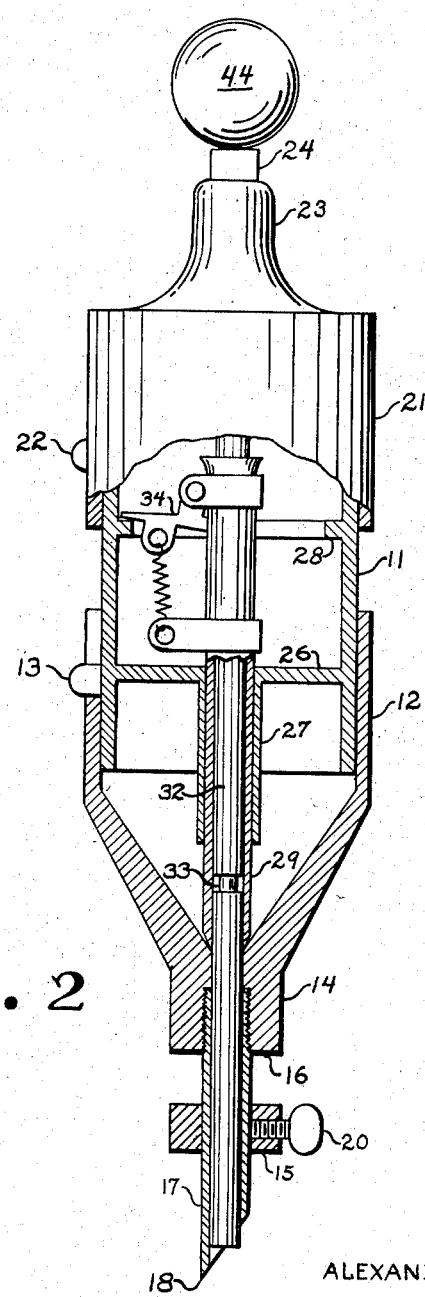

The foregoing objects and others will be better understood from the following description, when read in conjunction with the accompanying drawings, in which Figure 1 is a sectional view of the device along the centerline, with the magazine charged, and ready for operation;

Figure 2 is a similar view partly in section, with the mechanism compressed in the discharge position; and Figure 3 is an enlarged detail of the detent mechanism.

Referring more particularly to Figure 1, there is shown a generally cylindrical barrel element 11, preferably of plastic, glass, or other transparent material, having detachably affixed to one end thereof a magazine or hopper element 12. The magazine is substantially infundibuliform in shape, its larger end being of such internal diameter as to provide a slip fit over the exterior of the barrel, and attached thereto by a bayonet lock 13 or other convenient fastening means. The opposite end of the magazine tapers to a short cylindrical section 14 having a relatively thick wall, the end-face 16 thereof serving as a stop against the surface of the meat or other food article to be seasoned. The inner surface of the hopper may curve downward to the outlet, as shown in Figure 1, or it may have a straight slope downward from the major diameter, as in Figure 2.

Projecting axially from cylinder 14 is a tubular piercing element 17, having its free end cut angularly to the axis, in order to provide it with a point 18 for insertion into a food article. Tube 17 is preferably formed of stainless teel, but may be of aluminum, plastic, or other non-contaminating material; it may be threaded into cylinder 14 as shown, cemented, or fastened in any other suitable manner. Cylinder 14 is provided with a bore 19 therethrough, coaxial with tube 17 and having a diameter matching the internal diameter of the tube. The depth of injection may be controlled by positioning a stop collar 15 at any point on piercing tube 17, by a thumbscrew 20 or other conventional means.

Removably attached to the opposite end of barrel 11 is a cap section 21, its internal diameter being a slip fit over the barrel section, and the cap being attached thereto by means of a bayonet lock 22, for example, or other conventional fastening means. The upper end of the cap is provided with a guide bore therethrough coaxial with bore 19 and of the same diameter, and the cap may be prolonged upwardly by an extension 23 for additional bore length, and may also be strengthened by a sleeve 24 threaded into extension 23 or otherwise suitably attached thereto. Both the hopper 12 and the cap 21 are preferably formed of transparent plastic, but may also be of glass or metal.

The barrel is provided toward its lower end with a transverse internal wall 26, which serves as the upper limit of the hopper chamber. Wall 26 has an axial bore therethrough and a coaxial guide tube 27 extending downwardly therefrom and projecting into the hopper portion. Positioned toward the upper end of the barrel is an annular section 28 projecting radially inward from the wall of the barrel, and serving as a detent release.

A tubular cutter plunger 29, having its lower end sharpened to a cutting edge 31, is slidably disposed within guide tube 27, and is of such length that when it is retracted to its uppermost position, as shown in Figure 1, the cutting end is retained within the tube 27 and the upper end of cutter 29 abuts against the inner surface of cap 21. Cutter 29 may be of stainless steel or other material adapted to retain a cutting edge.

A plunger rod 32 is slidably disposed within the tubular plunger 29 and is adapted to translational movement simultaneously therewith or independently thereof, the tube and rod thus comprising a multiple piston. The rod is provided with an annular notch 33 or other catch means, at such a distance from its lower end that when the notch is engaged by detent 34 (better shown in Figure 3) externally mounted on tube 29, the lower end of the rod will be retracted within the tube a distance at least equal to the diameter of the rod.

The upper end of rod 32 is provided with a handle, which may have the form of the ball 44 shown or any other suitable shape, which handle serves to lift and handle the entire device, as well as a means of actuating cutting tube 29 and rod 32, both together and singly.

In operation the instrument, having its magazine charged with seasoning material, is gripped by the handle and held point downward. With a downward stabbing motion of the device, the meat or other food article is stabbed by point 18, tube 17 penetrating until surface 16 (or collar 15 if this is used) comes to rest against the surface of the food. The multiple piston arrangement is actuated by continued downward pressure on the handle, the sharp end of tube 29 cutting its way through the seasoning material, a portion of which is thus forced into the chamber formed by the retraction of rod 32 within the tube. As the cutting end of the tube reaches the bottom of the hopper, the outer end or trigger 38 of detent 34 strikes annulus 28, and pawl 36 is released from engagement with rod 32. The motion of tube 29 thereupon halts, while the rod continues downward, forcing the seasoning material from the end of the cutting tube, through bore 19 and tube 17, and into the article to be seasoned. The total length of rod 32 is such that the seasoning is just ejected from tube 17 when the handle strikes guide 24, halting all downward motion. Figure 2 shows the device in the position just described.

By then lifting on the handle the instrument is withdrawn from the food, the ejected seasoning remaining therein, rod 32 and tube 29 are retracted until the detent re-engages, and the device is ready for another operation.

Referring now to Figure 3, there is shown a detail more particularly illustrating the detent mechanism and the means by which cutting tube 29 and plunger 32 are sequentially operated, first together as a multiple piston, and then singly as individual elements. A clevis 30 or other suitable means is mounted on tube 29 near the upper end thereof, the open end of the clevis bearing detent 34 pivotally attached thereto by pin 35. The detent comprises a pawl portion 36 which enters tube 29 through an appropriate aperture 37 in the side thereof, and a trigger portion 38 on the opposite side of the pivotal attachment.

A second clevis 39 or other retentive means is mounted on tube 29 below the first clevis, and a tension spring 41 or other resilient element is disposed between the trigger and the second clevis and attached to each, as for example, by hooking the spring ends into apertures 42 and 43 in the trigger and clevis respectively. Spring 41 holds the pawl in engagement with the plunger rod at the annular notch 33; as long as the pawl is engaged with the rod, tube 29 and rod 32 must act together as a unit, being locked together by the detent passing through aperture 37 in the tube. Downward motion of the multiple piston brings the trigger into contact with annulus 28 in the barrel. Continued downward motion then rotates the detent mechanism about its pivot, the pawl is released from engagement, and the plunger rod continues downward, no longer carrying the tube with it. When the direction of motion is reversed, the end 25 of the tube, which may be flared as shown, strikes the inner wall of cap 21, halting it. Continued upward motion of the plunger then brings the notch into re-engagement with the pawl, again locking the cutting tube and plunger together, and the entire cycle may be repeated. It can thus be seen that a single thrust of the device deposits seasoning material in the food article, and that continuous operation requires only reciprocal vertical motion of the instrument, held in one hand by the handle at the top, and that numerous insertions can be made with extreme rapidity.

It will be readily apparent that although a particular embodiment of the invention has been described by way of example, many modifications of the individual elements and their relations to each other may be made without departing from the invention, and it is not intended to limit the invention to the embodiment described, but only by the spirit of the appended claims.

What is claimed is:

1. A food-seasoning device, comprising in combination a hollow body adapted to be charged with non-fluid seasoning material, a piston disposed within said body and having cutting means adapted to cut said seasoning, and a hollow food-piercing element disposed at one end of said body and communicating with the interior thereof, said piston being adapted to traverse the interior of said body and said piercing means and to cut said seasoning and to eject said seasoning through said piercing means.

2. A food-seasoning device, comprising in combination a generally cylindrical body, one end of said body comprising an infundibuliform hopper adapted to contain non-fluid seasoning material, a tubular piercing element extending outwardly from said hopper coaxial with said body and communicating with the interior of said hopper, and a piston slidably disposed within said body on the axis thereof, and adapted to traverse said hopper and said element, said piston being adapted to cut said seasoning and to eject said seasoning through said piercing element.

3. In a food-seasoning device, a multiple piston comprising in combination a generally cylindrical tube having one end formed into a seasoning cutting edge and having an aperture in the wall thereof, a resiliently mounted detent disposed on the exterior of said tube and having one end extending through said aperture, and a plunger rod slidably disposed within said tube and adapted to eject said cut seasoning material therefrom and having an annular notch adapted to mate with said detent, whereby said tube is releasably lockable to said rod.

4. A food-seasoning device, comprising in combination a generally cylindrical body having one end thereof formed into an infundibuliform hopper section adapted to contain non-fluid seasoning material and the opposite end formed into a closure section, said closure having an axial bore therethrough, an apertured wall disposed within said body transversely thereof and defining a magazine chamber with said hopper section, a tubular element extending outwardly from said hopper coaxial therewith and having its outer end angularly cut to form a food-piercing point, a tubular cutting element slidably disposed within said said aperture of said transverse wall and having the end within said magazine formed into a cutting edge and having an aperture in the wall thereof, a plunger rod slidably disposed within said cutting tube and extending through said closure bore and adapted to traverse said piercing element and having an annular detent catch, a detent mounted on the exterior of said cutting tube and extending through said aperture thereof and adapted to mate with said catch and to releasably lock said cutting tube to said rod, and detent-tripping means positioned within said cylindrical body in releasing relationship to said detent.

5. A food-seasoning device, comprising in combination a generally cylindrical barrel, an apertured cap detachably attached to one end of said barrel, an infundibuliform hopper detachably attached to the opposite end of said barrel, an apertured wall disposed within said barrel transversely thereof and defining a magazine chamber with said hopper, said magazine being charged with seasoning material, a tubular food-piercing element extending outwardly from said hopper coaxial therewith and communicating with said magazine, a cutting tube disposed within said barrel, one end of said tube having a cutting edge and extending through said aperture of said transverse wall into said magazine, the other end of said cutting tube having an aperture in the wall thereof, a resiliently mounted pivotable detent positioned on the exterior of said cutting tube and having a pawl on one end extending through said tube aperture, the other end of said detent comprising a trigger, a plunger rod slidably disposed within said cutting tube and extending through said apertured cap and adapted to traverse said piercing tube and having an annular notch adapted to releasably engage said pawl, and an annular detent release positioned within said barrel and extending inwardly from the wall thereof and adapted to engage said trigger, whereby when the plunger is thrust toward the hopper, the cutting tube cuts through the seasoning, the trigger strikes the release and disengages the cutting tube from the plunger, and the plunger continues through the piercing tube and ejects the cut seasoning material.

6. A food-seasoning device, comprising in combination a generally cylindrical body, one end of said body comprising an infundibuliform hopper adapted to contain nonfluid seasoning material, a tubular piercing element extending outwardly from said hopper coaxial with said body and communicating with the interior of said hopper, a slidable cutting tube disposed within said body coaxial therewith and adapted to traverse said hopper, a plunger rod slidably disposed within said cutting tube and longer than said cutting tube and having a detent catch and adapted to traverse said piercing element and to eject seasoning therefrom, and a detent mounted on the exterior of said cutting tube and adapted to mate with said catch to releasably lock said cutting tube to said rod.

References Cited in the file of this patent

UNITED STATES PATENTS

| | | |
|---|---|---|
| 2,005,395 | Rothfeld | June 18, 1935 |
| 2,110,263 | Dziedzic | Mar. 8, 1938 |
| 2,380,632 | Cousino | July 31, 1945 |
| 2,383,536 | Elliott | Aug. 28, 1945 |
| 2,700,960 | Liguori | Feb. 1, 1955 |

FOREIGN PATENTS

| | | |
|---|---|---|
| 172,659 | Great Britain | June 29, 1922 |